(12) United States Patent
Sim et al.

(10) Patent No.: US 9,487,295 B2
(45) Date of Patent: Nov. 8, 2016

(54) VEHICLE MEDIA DISTRIBUTION SYSTEM USING OPTICAL TRANSMITTERS

(76) Inventors: William James Sim, Te Atatu Peninsula (NZ); Nigel Greig, Pt Chevalier (NZ); Robert David Beck, Waiuku (NZ); Mark Nicklin, Flatbush (NZ)

( * ) Notice: Subject to any disclaimer, the term of this patent is extended or adjusted under 35 U.S.C. 154(b) by 652 days.

(21) Appl. No.: 13/296,331

(22) Filed: Nov. 15, 2011

(65) Prior Publication Data

US 2012/0178359 A1 Jul. 12, 2012

Related U.S. Application Data (60) Provisional application No. 61/413,749, filed on Nov. 15, 2010.

(51) Int. Cl.

| H04W 88/00 | (2009.01) |
| H04W 72/00 | (2009.01) |
| B64D 11/00 | (2006.01) |
| H04N 21/214 | (2011.01) |
| B64D 11/06 | (2006.01) |
| H04N 21/63 | (2011.01) |

(52) U.S. Cl.
CPC ..... *B64D 11/0015* (2013.01); *B64D 11/00151* (2014.12); *B64D 11/00154* (2014.12); *B64D 11/0624* (2014.12); *H04N 21/2146* (2013.01); *H04N 21/631* (2013.01)

(58) Field of Classification Search
None
See application file for complete search history.

(56) References Cited

U.S. PATENT DOCUMENTS

| 1,368,307 A | 2/1921 | Waldron |
| 1,498,727 A | 6/1924 | Haskel |
| 1,514,152 A | 11/1924 | Gernsback |
| 1,586,140 A | 5/1926 | Bonnette |
| 1,807,225 A | 5/1931 | Pack |
| 2,346,395 A | 4/1944 | Rettinger |
| 2,379,891 A | 7/1945 | Eckardt |
| 2,427,844 A | 9/1947 | Eklov |
| 2,490,466 A | 12/1949 | Olson |
| 2,603,724 A | 7/1952 | Kettler |
| 2,622,159 A | 12/1952 | Herman |
| 2,714,134 A | 7/1955 | Touger |
| 2,761,912 A | 9/1956 | Touger |
| 2,775,309 A | 12/1956 | Villchur |
| 2,848,560 A | 8/1958 | Wiegand |
| 2,972,018 A | 2/1961 | Hawley et al. |
| 2,989,598 A | 6/1961 | Touger |

(Continued)

FOREIGN PATENT DOCUMENTS

| CN | 1101203 | 4/1995 |
| CN | 1213626 | 4/1999 |

(Continued)

OTHER PUBLICATIONS

Office Action issued in the corresponding Russian patent application with English translation Nov. 29, 2014.

(Continued)

*Primary Examiner* — Philip Sobutka
(74) *Attorney, Agent, or Firm* — Jackson Walker L.L.P.

(57) ABSTRACT

A wireless media distribution system for a passenger vehicle including a media server and a plurality of transmitters adapted to wirelessly transmit media signals representative of media delivered from the media server. Each transmitter is adapted to direct a media signal to a selected passenger location or a group of passenger locations.

33 Claims, 6 Drawing Sheets

(56) References Cited

U.S. PATENT DOCUMENTS

| | | |
|---|---|---|
| 3,073,411 A | 1/1963 | Bleazey |
| 3,112,005 A | 11/1963 | Shaw |
| RE26,030 E | 5/1966 | Marchand |
| 3,367,040 A | 2/1968 | Vani |
| 3,403,235 A | 9/1968 | Bishop |
| 3,532,837 A | 10/1970 | Dyar |
| 3,602,329 A | 8/1971 | Bauer et al. |
| 3,644,939 A | 2/1972 | Beguin |
| 3,727,004 A | 4/1973 | Bose |
| 3,766,332 A | 10/1973 | Carlson |
| 3,927,262 A | 12/1975 | Goeckel |
| 3,997,739 A | 12/1976 | Kishikawa |
| 4,005,267 A | 1/1977 | Gorike |
| 4,005,278 A | 1/1977 | Gorike |
| 4,006,318 A | 2/1977 | Sebesta |
| 4,027,117 A | 5/1977 | Nakamura |
| 4,041,256 A | 8/1977 | Ohta |
| 4,058,688 A | 11/1977 | Nishimura |
| 4,156,118 A | 5/1979 | Hargrave |
| 4,158,753 A | 6/1979 | Gorike |
| 4,211,898 A | 7/1980 | Atoji et al. |
| 4,297,537 A | 10/1981 | Babb |
| 4,338,489 A | 7/1982 | Gorike |
| 4,347,405 A | 8/1982 | Davis |
| 4,399,334 A | 8/1983 | Kakiuchi |
| 4,403,120 A | 9/1983 | Yoshimi |
| 4,418,248 A | 11/1983 | Mathis |
| 4,441,596 A | 4/1984 | Nakahara |
| 4,455,675 A | 6/1984 | Bose |
| 4,494,074 A | 1/1985 | Bose |
| 4,527,282 A | 7/1985 | Chaplin et al. |
| 4,528,689 A | 7/1985 | Katz |
| 4,529,058 A | 7/1985 | Emery |
| 4,572,324 A | 2/1986 | Fidi et al. |
| 4,581,496 A | 4/1986 | Sweany |
| 4,592,366 A | 6/1986 | Sainomoto |
| 4,644,581 A | 2/1987 | Sapiejewski |
| 4,646,872 A | 3/1987 | Kamon |
| 4,669,129 A | 6/1987 | Chance |
| 4,670,733 A | 6/1987 | Bell |
| 4,742,887 A | 5/1988 | Yamagishi |
| 4,809,811 A | 3/1989 | Gorike |
| 4,847,908 A | 7/1989 | Nieuwendijk |
| 4,852,177 A | 7/1989 | Ambrose |
| 4,893,695 A | 1/1990 | Tamura et al. |
| 4,905,322 A | 3/1990 | Aileo et al. |
| 4,922,542 A | 5/1990 | Sapiejewski |
| 4,949,806 A | 8/1990 | Hofer |
| 4,977,619 A | 12/1990 | Crimmins |
| 4,985,925 A | 1/1991 | Langberg et al. |
| 4,989,271 A | 2/1991 | Sapiejewski |
| 5,001,763 A | 3/1991 | Moseley |
| 5,020,163 A | 6/1991 | Aileo et al. |
| 5,117,461 A | 5/1992 | Moseley |
| 5,134,659 A | 7/1992 | Moseley |
| 5,181,252 A | 1/1993 | Sapiejewski |
| 5,182,774 A | 1/1993 | Bourk |
| 5,208,868 A | 5/1993 | Sapiejewski |
| 5,267,321 A | 11/1993 | Langberg |
| 5,305,387 A | 4/1994 | Sapiejewski |
| 5,343,523 A | 8/1994 | Bartlett et al. |
| 5,497,426 A | 3/1996 | Jay |
| 5,504,281 A | 4/1996 | Whitney |
| 5,652,799 A | 7/1997 | Ross et al. |
| 5,675,658 A | 10/1997 | Brittain |
| 5,740,257 A | 4/1998 | Marcus |
| 5,880,867 A | 3/1999 | Ronald |
| 5,913,163 A | 6/1999 | Johansson |
| 5,913,178 A | 6/1999 | Olsson |
| 5,937,070 A | 8/1999 | Todter et al. |
| 5,969,837 A | 10/1999 | Farber |
| 5,970,160 A | 10/1999 | Nilsson et al. |
| 6,055,425 A | 4/2000 | Sinivaara |
| 6,061,456 A | 5/2000 | Andrea et al. |
| 6,163,615 A | 12/2000 | Callahan |
| 6,278,786 B1 | 8/2001 | McIntosh |
| 6,311,155 B1 | 10/2001 | Vaudrey |
| 6,510,182 B1 | 1/2003 | Lee |
| 6,577,419 B1 | 6/2003 | Hall |
| 6,597,792 B1 | 7/2003 | Sapiejewski |
| 6,614,126 B1 | 9/2003 | Mitchell |
| 6,671,325 B2 | 12/2003 | Lee |
| 6,741,841 B1 | 5/2004 | Mitchell |
| 6,788,935 B1 | 9/2004 | McKenna |
| 6,831,984 B2 | 12/2004 | Sapiejewski |
| 6,912,501 B2 | 6/2005 | Vaudrey |
| 7,103,188 B1 | 9/2006 | Jones |
| 7,103,324 B2 | 9/2006 | Sanford |
| 7,177,638 B2 | 2/2007 | Funderburk |
| 7,248,705 B1 | 7/2007 | Mishan |
| 7,266,389 B2 | 9/2007 | Karaoguz |
| 7,280,825 B2 | 10/2007 | Keen |
| 7,321,383 B2 | 1/2008 | Monaghan |
| 7,337,111 B2 | 2/2008 | Vaudrey |
| 7,483,696 B1* | 1/2009 | Mitchell ............... 455/431 |
| 7,565,143 B2* | 7/2009 | Takeuchi et al. ...... 455/431 |
| 7,587,734 B2 | 9/2009 | Logan |
| 7,610,602 B2 | 10/2009 | Ficco |
| 7,676,225 B2 | 3/2010 | Funderburk |
| 7,721,309 B2 | 5/2010 | Nishikawa |
| 7,769,187 B1 | 8/2010 | Farrar |
| 8,472,865 B2* | 6/2013 | Taherloo ............. 455/3.06 |
| 2002/0013698 A1 | 1/2002 | Vaudrey |
| 2002/0015501 A1 | 2/2002 | Sapiejewski |
| 2004/0077308 A1* | 4/2004 | Sanford et al. ...... 455/3.06 |
| 2004/0125958 A1 | 7/2004 | Brewster |
| 2005/0021602 A1 | 1/2005 | Noel |
| 2005/0039208 A1 | 2/2005 | Veeck |
| 2005/0216938 A1 | 9/2005 | Brady |
| 2005/0232445 A1 | 10/2005 | Vaudrey |
| 2005/0276430 A1 | 12/2005 | He |
| 2006/0072919 A1 | 4/2006 | Edelist |
| 2006/0075934 A1 | 4/2006 | Ram |
| 2006/0107295 A1 | 5/2006 | Margis |
| 2006/0143661 A1 | 6/2006 | Funderburk |
| 2006/0143662 A1 | 6/2006 | Easterling |
| 2006/0270373 A1 | 11/2006 | So |
| 2006/0271967 A1* | 11/2006 | So ............................ 725/76 |
| 2007/0044126 A1 | 2/2007 | Mitchell |
| 2007/0213009 A1* | 9/2007 | Higashida et al. ...... 455/3.06 X |
| 2007/0256107 A1 | 11/2007 | Anderson |
| 2008/0130924 A1 | 6/2008 | Vaudrey |
| 2008/0132294 A1 | 6/2008 | Bennett |
| 2008/0182573 A1* | 7/2008 | Lauer et al. .......... 455/431 |
| 2008/0189748 A1 | 8/2008 | Bleacher et al. |
| 2009/0007193 A1 | 1/2009 | Correa |
| 2009/0138920 A1 | 5/2009 | Anandpura |
| 2009/0215469 A1 | 8/2009 | Fisher |
| 2009/0228908 A1 | 9/2009 | Margis |
| 2009/0249408 A1 | 10/2009 | Smallhorn |
| 2010/0144267 A1 | 6/2010 | Funderburk |

FOREIGN PATENT DOCUMENTS

| | | |
|---|---|---|
| DE | 3512405 | 10/1985 |
| DE | 3512405 A1 | 10/1985 |
| DE | 3706481 | 9/1987 |
| DE | 8703084 | 10/1987 |
| DE | 8703084 | 11/1987 |
| EP | 0195641 B1 | 9/1986 |
| EP | 0414479 | 2/1991 |
| EP | 0582404 | 2/1994 |
| EP | 0582404 A3 | 2/1994 |
| EP | 0688143 | 12/1995 |
| EP | 0873040 | 10/1998 |
| EP | 0688143 B1 | 8/2001 |
| EP | 1349420 | 10/2003 |
| EP | 2 161 195 A1 | 3/2010 |
| EP | 2226902 | 9/2010 |
| FR | 2595178 | 9/1987 |
| FR | 2595178 A1 | 9/1987 |
| GB | 1379372 | 1/1975 |
| GB | 2000941 | 1/1979 |
| GB | 2168220 A | 6/1986 |

(56) References Cited

FOREIGN PATENT DOCUMENTS

| | | |
|---|---|---|
| GB | 2172470 A | 9/1986 |
| GB | 2187361 A | 9/1987 |
| GB | 2188210 A | 9/1987 |
| GB | 2234882 | 2/1991 |
| GB | 2234882 A | 2/1991 |
| JP | 04227396 A | 8/1992 |
| NL | 8101815 | 11/1981 |
| WO | WO91/13429 | 9/1991 |
| WO | WO 95/00946 | 1/1995 |
| WO | WO 95/08907 | 3/1995 |
| WO | WO 98/41974 | 9/1998 |
| WO | WO 2005/125207 A2 | 12/2005 |
| WO | WO 2009/036366 A1 | 3/2009 |
| WO | WO 2009/036375 A1 | 3/2009 |

OTHER PUBLICATIONS

D'Appolito Testing Loudspeakers, Audio Amateur Publications, 1998, Chapter 2, Driver Testing, pp. 9-36.
Beranek, Noise and Vibration Control, Chapter 10, pp. 245-269.
John Borwick, Loudspeaker and Headphone Handbook (1st Ed., Butter & Co., 1988) complete text including references cited therein.
Small, Richard H., "Closed-Box Loudspeaker Systems", Part 1: Analysis, Journal of The Audio Engineering Society, 1972, pp. 271-282.
E.A.G. Shaw & G.J. Thiessen, Acoustcs of Crumural Eaphones, 34 The Jounal of The Acoustcal Socey of America, No. 9, Sep. 1962.
Alfred DiMattia, "A Practical Ear Enclosure With Selectively Coupled Volume", AES Paper No. 460, AES Convention 31 (Oct. 1966), pp. 1-12.
Ifreg DiMattia, "A Practical Ear Enclosure With Selectively Coupled Volume", vol. 15 The Journal of The Acoustical Society of America, No. 3 (Jul. 1967), pp. 295-298.
Naraji Sakamoto, "Linear-Drive Headphones with Eardrum Response", AES Paper 1341, AES Convention 60 (May 1978), pp. 1-32.
Carl Poldy, "The Electrical Equivalent Circuit of Porous Complaint Membranes and Related Systems", AES Paper 1957 (D2), AES Convention 73 (Mar. 1983), pp. 1-15.
Ver, et al., "Sound-Absorbing Materials and Sound Absorbers", Noise and Vibration Control Engineering (John Wiley & Sons, Inc.2006), pp. 215-277.
Borwick, Loudspeaker and Headphone Handbook, Third Edition, Focal Press, Section 14.2.7 and 14.2.8 (2001).
Borwick, Loudspeoker and Heodphone Handbook Third Edition, Focal Press, Section 14.2.3 and Fig. 14.8 and p. 605 (2001).
Beranek, et al., Noise and Vibration Control Engineering, Second Edition (John Wiley & Sons, Inc. 2006) pp. 216, 231-232, 235-239.
Handbook for Sound Engineers, The New Audio Cyclopedia, Second Edition (Macmillan Computer Publishing, Copyright 1987 and 1991), p. 119.
Small, Richard H., "Direct-Radiator Loudspeaker System Analysis", IEEE Transactions on vol. 19, issue 4, Dec. 1971, pp. 269-281.
D'Appolito, "Low-Frequency System Electrical Impedance Tests," Testing Loudspeakers, Chapter 3, pp. 37-49 (1998).
Allan D. Pierce, Acoustics (excerpt), Acoustical Society of America through the American Institute of Physics, pp. 324-328 (1991).
Peter Lert, "Triumph of the Voyager," Air Progress vol. 49, No. 3, Mar. 1987, pp. 6-12 and 75-77.
"Headset cancels noise with noise," Show Daily, Jun. 15, 1987, p. 32.
E.H. Berger, "Using the NRR to Estimate the Real World Performance of Hearing Protection," Sound and Vibration, Jan. 1983, pp. 12-18.
Alice H. Suter, "Noise Wars," Technology Review, Nov./Dec. 1989, pp. 42-49.
George F. Kuhn, "The Pressure Transformation from a Diffuse Sound Field to the External Ear and . . . ," J. Acoust. Soc. Am., vol. 65, No. 4, Apr. 1979, pp. 991-100.
Jazef J. Zwislocki, "Sound Analysis in the Ear: A History of Discoveries," American Scientist, vol. 69, Mar.-Apr. 1981, pp. 184-192.
Don Denton, "Program Converts Test Data into Reliability Numbers," Electronic Design, Aug. 19, 1982, pp. 157-164.
Amar G. Bose, "Sound Recording and Reproduction . . . " Technology Review, vol. 75, No. 7, Jun. 1973, and No. 8, Jul./Aug. 1973 by MIT, Cambridge, MA.
John Free, "Noise Zapper," Popular Science, Jan. 1987, pp. 76-77 and 96.
Jack Norris, "Voyager, The World Flight, The Official Log, Flight Analysis and Narrative Explanation," Northridge, California, ISBN 09620239-0-6 (1987).
"Bose Acoustic Noise Cancelling Headsets to be Tested on Voyager Flight," Bose Press Release, Framingham, MA.
"Voyager Pilots Aviod Hearing Loss on Historic Flight, Bose Corporation's Noise-Cancelling Headsets Were 'Mission Critical,'" Bose News Release, Framingham, MA (1987).
William D. Marbach, "Up, Up and Around," Newsweek, Dec. 29, 1986, pp. 34-44.
Marc E. Cook, "The Art of Noise," AOPA Pilot, Dec. 1989, pp. 65-69.
Phil Todd, "Principles of Magnetic Component Design," Powercon10 Professional Advancement Seminar, Power Innovations, Mar. 21, 1983, San Diego, California. pp. 1-35.
Capt. Stephen P. Shelton, "Active Noise Reduction (ANR)," Article (publication information unknown; before Nov. 15, 2011).
McKinley, et al., "Estimated Reductions in Noise-Induced Hearing Loss by Application of ANR Headsets," Scientific Basis of Noise-Induced Hearing Loss, Thieme, Chapter 28 (1996).
"Noise-Cancelling Headsets Featured at Telex Booth," NBAA Convention News, New Orleans, LA, Sep. 30, 1987, pp. 85-86.
Telex Communications, Inc. Aviation Products and Price Information Sheet, Effective Date Nov. 15, 1986.
"MDR-NC20 Service Manual," Noise Canceling Stereo Headphones Sony (1996).
"MDR-NC10 Service Manual," Noise Canceling Stereo Headphones Sony (2001).
"Presenting Sennheiser Electronic," Sennheiser Chronicle, Sennheiser Electronic, D-3002 Wedemark (1987).
"Aearo Peltor Stratospher," AOPA Pilot, Jul. 1998, p. 114.
"Active Noise Reduction for use in Aircraft" Helmets Limited, Apr. 1990.
"Creative Unveils Aurvana X-Fi Noise-Canceling Headphones," Wireless News, Sep. 24, 2007 M2 Communications Ltd.
David Clark Company, Inc. Noise Attenuating Aviation Headsets and Accessories Product Information Sheet, 8 pages (1985).
David Pogue, "Flying? Sit Back and Relax—And Zone Out for Less; Competing with Noise-Canceling Bose Headgear. (Finance)," International Herald Tribune, Jun. 14, 2007: 1-2.
Audio-Technica 900 Series Stereo Headphones Product Information Sheet, 2 pages (1995).
Elliott H. Berger, "Single Number Measures of Hearing Protector Noise Reduction," E-A-R LOG2 (1996).
Elliott H. Berger, "Preferred Methods for Measuring Hearing Protector Attenuation," The 2005 Congress and Exposition on Noise Control Engineering, Aug. 7-10, 2005, Braz.
Gauger, et al., "Voyager Pilots Avoid Hearing Loss on Historic Flight," S)V Observer, Bose Corporation, Framingham, MA (at least before Nov. 15, 2011).

* cited by examiner

VEHICLE MEDIA DISTRIBUTION SYSTEM USING OPTICAL TRANSMITTERS

This application claims the benefit of U.S. Provisional Application Ser. No. 61/413,749, filed Nov. 15, 2010.

FIELD OF THE INVENTION

This invention relates to systems for distributing media, and is particularly, although not solely, applicable to onboard entertainment systems for use in passenger vehicles. One example of application of the invention is in in-flight entertainment (IFE) systems such as those systems used in large commercial aircraft and similar passenger vehicles. Another example of application of the invention is use in media delivery systems such as audio or video-on-demand systems.

BACKGROUND

Air travel has become an increasingly popular and affordable mode of transport. Airlines have increasingly sought to provide their passengers with improved services during the course of a flight as competition for passengers has become more intense. One significant in-flight service which is important to passengers is in-flight entertainment. This is usually provided by in-flight entertainment (IFE) systems.

Modern IFE systems provide passengers with a variety of audio and visual media options, for example, music channels, games, movies, and television programs. Users can be provided with audio or video-on-demand, meaning that each individual user may select an audio track or audio channel, or an audio-visual programme that they wish to listen to, or watch, at any given time. This is usually achieved by each passenger seat in an aircraft environment having its own visual display unit (usually in the form of an LCD display) and an appropriate jack for receiving the plug for a headset which delivers the audio content to the user.

The delivery of video-on-demand services in a large aircraft requires complex systems. The media is typically stored in digital format and delivered over a network in the aircraft via one or more media servers. The network includes seat distribution units which receive the audio visual information requested by the passengers seated in the seats that the seat distribution unit serves. The seat distribution unit provides the appropriate outputs (being analogue signals, for example) to the relevant screen displays and physical connection points for the headsets.

There are a number of physical wiring problems through the use of the seat distribution arrangement. If a passenger seat needs to be moved or changed, for example, then the wiring to the seat distribution unit needs to be changed. Furthermore, the requirement of having a physical cable that runs from a jack point in a seat armrest for a headset is also problematic. This is particularly so when passengers wish to leave their seats or move other objects in the vicinity of the seats, for example, raising or lowering a tray table, or moving objects such as drinks, plates, pillows and blankets. Finally, passenger seats such as airline seats are being made smaller and lighter, so room in and around armrests for electronics and cabling is becoming increasingly scarce.

SUMMARY

It is an object of the invention to provide a media distribution system which overcomes one or more disadvantages of existing systems, or which alternatively provides a useful alternative to existing systems.

A further alternative object of the invention is to provide a media delivery device which overcomes one or more disadvantages of existing devices, or which alternatively at least provides a useful alternative.

In one aspect the invention broadly provides a wireless media distribution system comprising:
one or more media servers; and
a plurality of transmitters adapted to transmit signals representative of media delivered from the media server, and wherein each transmitter is adapted to direct a signal to a selected passenger location or a group of passenger locations.

Preferably the group of passenger locations comprises a plurality of passenger locations which are adjacent to each other.

Preferably each passenger location comprises a seat area in which a passenger would typically be seated.

Preferably the signal is adapted for reception by a media player device associated with a passenger located in the passenger location.

Preferably the media player device comprises a headset.

In one embodiment the headset includes a plurality of receivers for receiving the signal.

Preferably one or more of the transmitters includes a shaping means to shape the direction of the signal toward the selected passenger location or group of passenger locations. In one embodiment the transmitter comprises an optical transmitter such as an infrared transmitter and the shaping means may comprise a lens and/or collimator.

In another embodiment the transmitter may comprise part of a visual display unit. The transmitter may be fixed to the visual display unit or comprise part of a housing of the visual display unit.

In another embodiment, the transmitter is co-located with the display.

In yet another embodiment, the transmitter comprises a back-lighting means of the display.

In another aspect, the invention provides a media player device for a passenger vehicle wireless media distribution system, comprising a plurality of optical signal receivers for receiving a media signal form the media distribution system, and a processor for processing the received signal.

Further aspects of the invention will become apparent from the following description.

DRAWING DESCRIPTION

One of more embodiments of the invention will be described below with reference to the accompanying drawings, in which.

DETAILED DESCRIPTION

Figure 1:
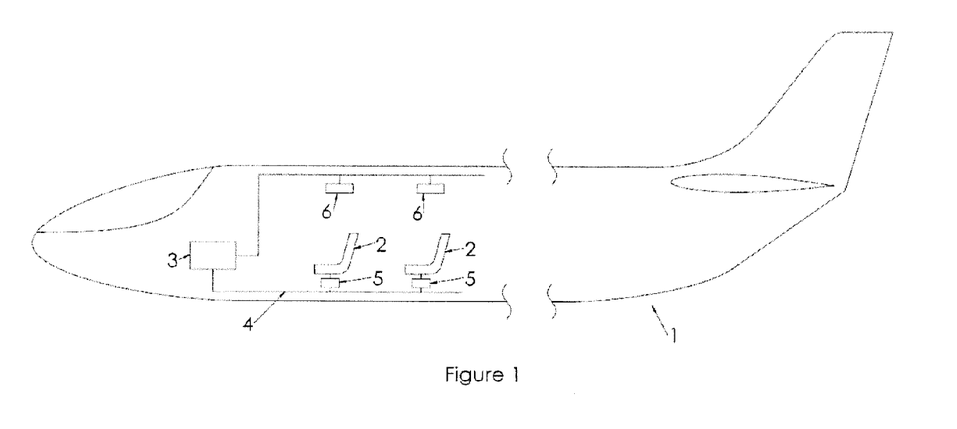
FIG. 1: is a diagrammatic side elevation in cross-section through a passenger vehicle, being an aircraft.

Referring to FIG. 1, a diagrammatic view in cross-section through a passenger vehicle, in this instance an aircraft, is shown. Those skilled in the art will immediately appreciate that the vehicle in which the invention is implemented may take other forms, for example a train, bus or car. The vehicle is generally referenced 1 and includes a plurality of passenger seats 2. A media server and associated network interface is provided which is generally referenced 3 which forms part of a network together with cabling 4 and seat distribution units 5 for delivering media from the media server 3 to occupants of the seats 2.

For simplicity, media delivery devices or media player devices are not shown in the diagram. However, they may comprise headsets or earphones and visual display units such as LCD displays. In prior art systems, the media player devices are physically connected to the network. In contrast, the present invention provides for a plurality of transmission devices 6 which allow media from media server 3 to be wirelessly delivered to the occupants of the seats 2. In one embodiment, such as that shown in FIG. 1, the existing network which includes seat distribution units 5 may still be used to provide visual media to the visual display units associated with the passenger seats 2, and the wireless transmitters 6 may be used to deliver audio to passengers wirelessly, the audio being received by wireless headsets, for example. Alternatively, the wireless transmission network comprising transmitters 6 may be used to deliver both video and audio information to the occupants of seats 2.

In one embodiment the wireless network is implemented using optical transmitters 6, such as infrared transmitters, for example. The various embodiments are described with reference to infrared wireless communication, but those skilled in the art will appreciate that signals in other parts of the electromagnetic spectrum could be used.

In one embodiment the wireless media distribution network, through use of transmitters 6, provides information from the media server in a plurality of channels which are time division multiplexed. Therefore, the information is provided on an optical carrier signal, such as an infrared signal, in a digital format for reception and decoding by the media player device used by the seat occupant.

In one embodiment the optical signal which is transmitted is shaped or otherwise directed to provide an optical beam so as to target a selected seat or selected group of seats. The optical beam may be directed using one or more lenses or collimators, or a combination of these elements. Furthermore, the position of the transmitter may also be used to direct the optical signal, or at least limit the spillover from the signal into those regions or seats where the signal is not intended to be received. Therefore, in one embodiment the transmitter elements may be provided above passenger seats as shown in FIG. 1. In other embodiments, transmitters may be provided in other locations, for example, being co-located with a visual display unit in the rear of a seat immediately in front of the seat to which the signal is to be delivered.

Thus in one embodiment an optical transmitter 6 is associated with each passenger seat. The signal from the optical transmitter 6 is delivered to a selected passenger location, being the area associated with that seat within which a passenger can reasonably receive the signal, by one or more of: signal strength, signal direction or signal focus. The signal from each transducer can thus be directed to the seat occupant. This allows the media distribution system to implement a video and/or audio-on-demand system whereby the media server delivers audio and/or video media wirelessly to the receiving media device used by the individual seat occupant. This may be achieved using an analogue signal, or may be achieved with a signal in a digital format. Furthermore, the transmitter may be provided as part of a dock for example, for receiving a headset or other media player device. The dock may be provided on a part of the seat, for example an armrest, or may be provided on the rear of the seat in front of the selected passenger location to be serviced by the transmitter. In one embodiment the dock is capable of charging the media device while physically supporting or holding the device. The dock may also be used for transmitter/media device "pairing". Thus, as headsets for example are distributed to vehicle passengers, each passenger may dock the headset to pair the headset with the transmitter so that the headset identifies the transmitter with which it is to communicate. Appropriate pairing may be effected in other ways as necessary. For example pairing may occur automatically upon the media device being brought within the signal range of the relevant transmitter.

Figure 2:
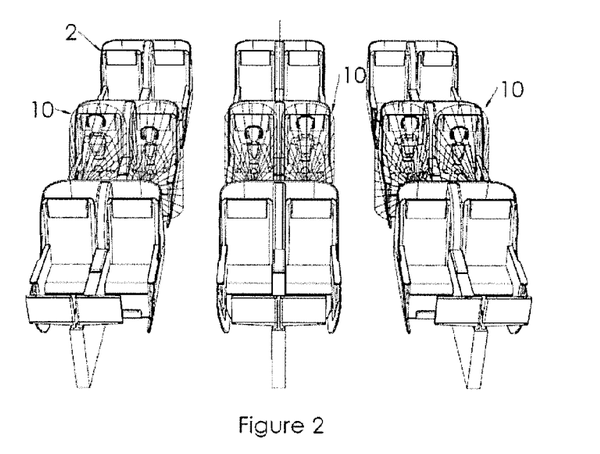
FIG. 2: is a diagrammatic perspective view of an interior of an aircraft cabin such as that shown in FIG. 1.

Referring to FIG. 2, a plurality of seats 2 are shown diagrammatically with occupants. The mechanical separation of optical beams from transmitters which may be located in the back of the seat immediately in front of the seat occupant is shown diagrammatically as optical beam 10. As discussed above, lenses, collimators, or a combination of both may be used to direct and/or focus the transmitter signals to provide the optical beams as shown in FIG. 2. In the embodiment shown in FIG. 2, each bean 10 is directed toward a separate user so that the user may receive the information from a media player device such as a headset adapted to receive the optical signal and decode that signal, if necessary. There is minimum spillover signal beyond the selected passenger location for each user.

Figure 3:
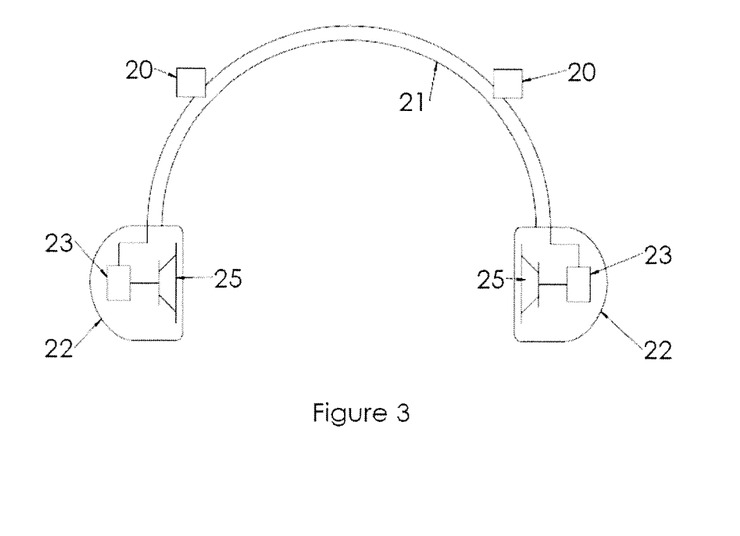
FIG. 3: is a diagrammatic cross-section through a headset according to the present invention.

As shown in FIG. 3, a headset for use with the media distribution system described herein may, for example, have a plurality of receivers such as optical receivers 20. Similarly, more than one receiver may also be provided on an earphone arrangement. In the embodiment shown, these may be located on the headband 21 of the headset, but could be located in other positions, for example on ear cups 22. The signal received by one or both of the receivers 20 is provided to one or more processors 23 which perform the steps of detecting the signal from the optical carrier and performing any decoding that may be necessary before providing an appropriate analogue audio signal to drivers or speakers 25. In one embodiment, as part of the processing performed by processors 23, a comparison is performed between the signals received by each of the receivers 20 to determine which signal is strongest or possesses the best signal quality, and then that signal may be used as the signal which is processed to provide the output to speakers 25. This allows adequate signal reception to be maintained despite the passenger changing position in the seat, and allows the transmitter to be provided to either side of the selected passenger location.

In another embodiment of the invention a transmitter 6 (or a group of transmitters 6, if appropriate) may be used to provide a signal to a selected group of passenger seat locations. In one embodiment this is achieved by time division multiplexing the signal from the transmitter so that channels can be reused, for example.

Figure 4:
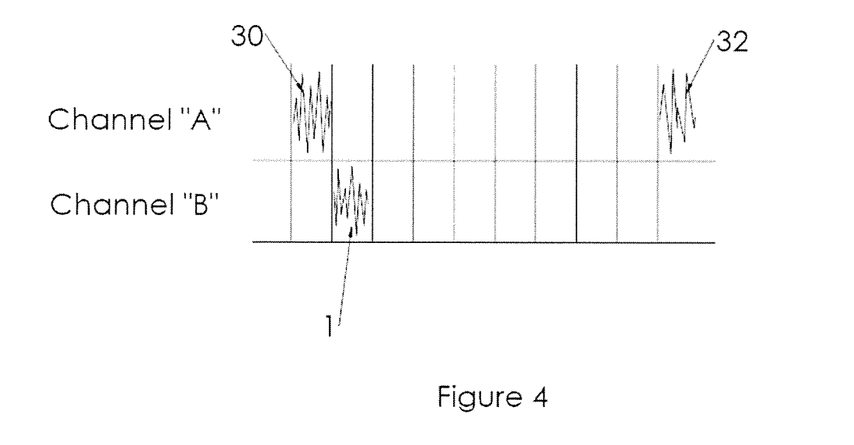
FIG. 4: is a diagrammatic illustration of signal strength with respect to time shown time division multiplexing of a signal to provide a plurality of channels.

Turning to FIG. 4, a known time division multiplexing arrangement is shown for two channels in which information relating to channel A is provided in one time segment 30 of the signal, and information corresponding to that desired for transmission in channel B is provided in a further time segment 31. Although not illustrated in the FIG. 4, this may continue over a number of channels until such time as the information for channel A is again transmitted in a further time segment 32.

Figure 5:
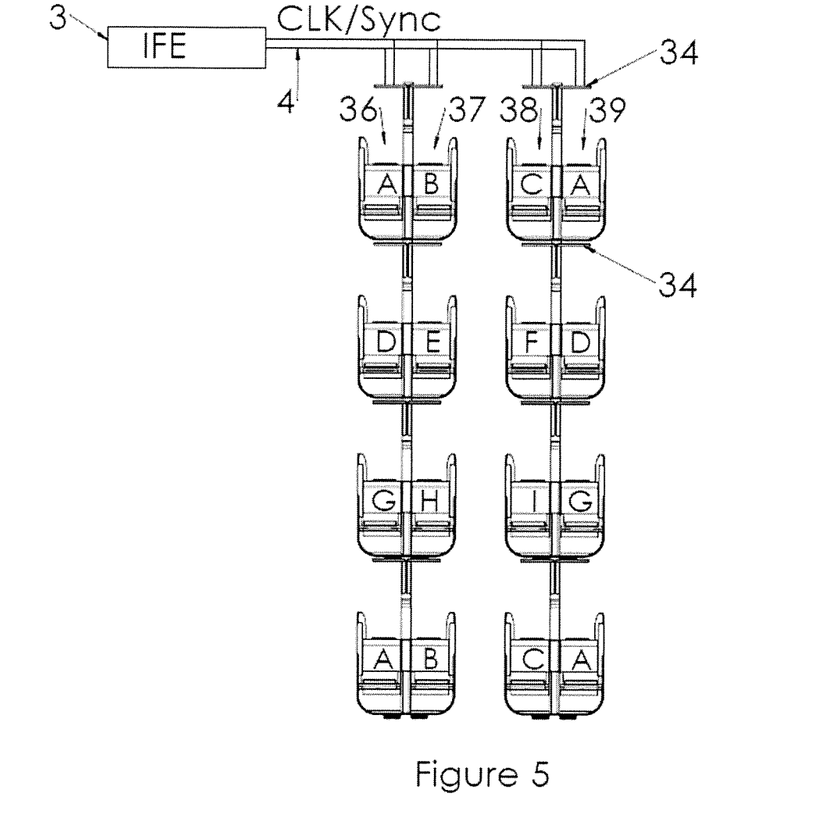
FIG. 5: is a diagrammatic plan view of an embodiment of the invention in which a plurality of transmitters and a plurality of channels is used to cover a group of passenger seats.

Turning to FIG. 5, in one embodiment of the invention a group of sixteen seats, for example, can be covered by transmitters which provide beans restricted to cover passenger locations for no more than two adjacent seats. The visual display associated with each seat is referenced 34. In this embodiment each display may have an associated transmitter (not shown in FIG. 5, but shown instead in FIG. 6). Therefore, in FIG. 5, nine channels, being channels A to I, are provided. In the first row of seats, being Row 35, a transmitter provides a signal sufficient to cover the passenger locations for seats 36 and 37, providing the signal on channels A and B. In seats 38 and 39, the signal is provided on channels A and C. Channel A can be reused in seat 39 since the transmitter used for seats 36 and 37 does not extend, or spillover, a signal to seat 39.

Figure 6:
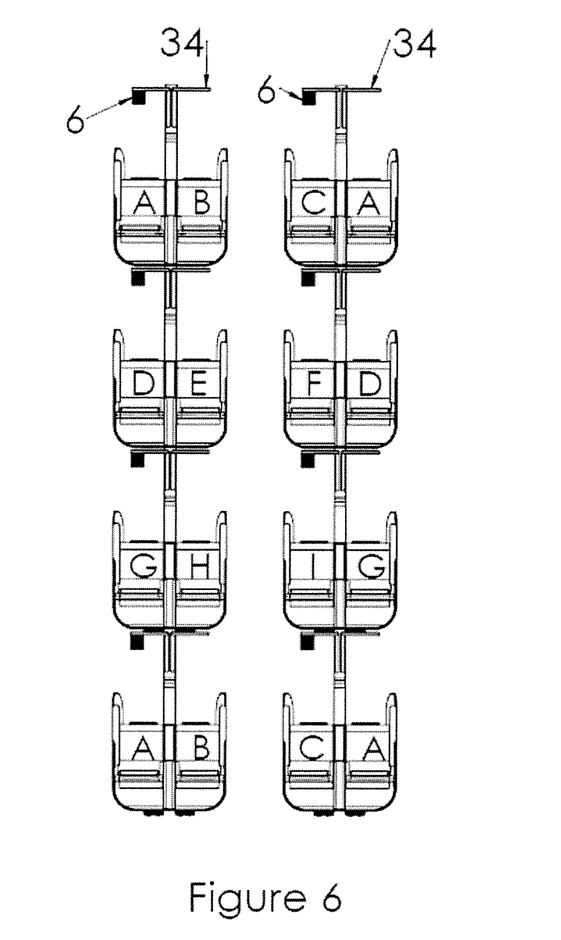
FIG. 6: is a diagrammatic plan view of a group of passenger seats including a transmitter arrangement according to one embodiment of the invention.
Figure 6B:
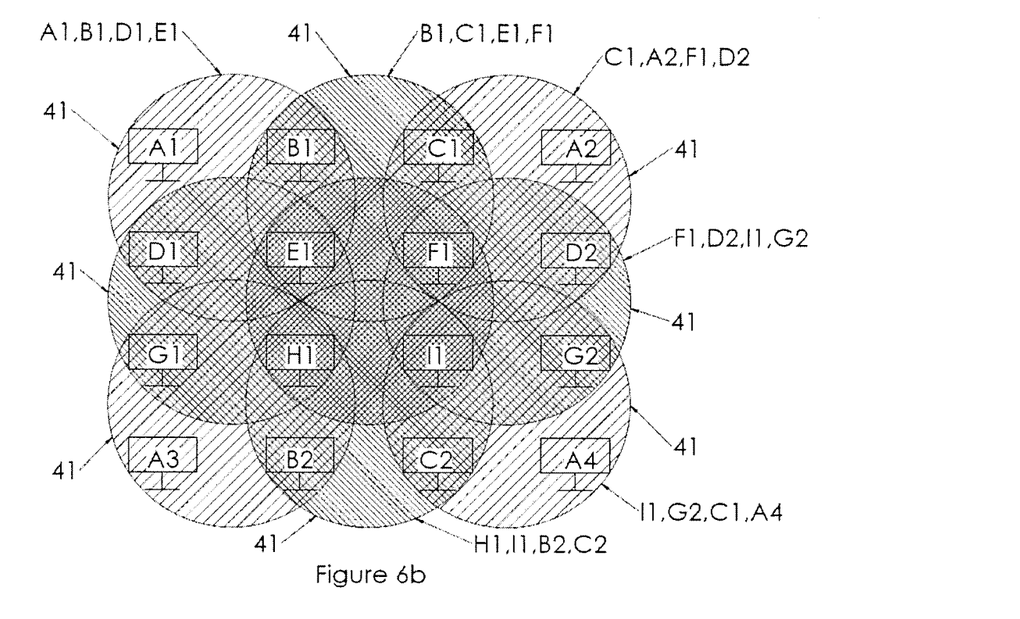
FIG. 6*b*: is a diagrammatic plan view of a group of passenger seats including a transmitter arrangement according to one embodiment of the invention.

Referring to FIG. 6, the embodiment described above with reference to FIG. 5 is shown in which the transmitters 6 are provided in a location optimised to minimise lateral stray signal emission. Therefore, for example, the transmitters 6 may be co-located with the visual display unit or screen which is provided immediately in front of the passenger location (and often provided in the rear of the seat immediately in front of the passenger location).

In an embodiment such as that shown in FIG. 6, the processor associated with the visual display unit adjacent to which the transmitter is located may perform processing for decoding and/or processing a signal received from the media server, or the network, to provide the appropriate signal for transmission by the transmitter. Alternatively, the decoding may occur in the processor provided in the seat distribution unit associated with the relevant seat or row of seats. Additionally, or alternatively, processing or encoding may be performed in the transmitter unit itself.

FIG. 6a shows a further embodiment in which one or more transmitters 6 send a plurality of channels in discrete coverage zones. As shown in the drawing figure, "A2" is channel "A", signal "2"; "A1" is channel "A", signal "1", so channel A is used to carry different media at the non-overlapping (i.e. non-interfering) locations. It will be seen that one transmitter can send multiple channels to a plurality of passenger locations, so fewer transmitters are required than the number of passenger locations covered by the transmission. The transmitters in this embodiment may conveniently be located above the passenger locations that they service, for example being provided on a ceiling of a passenger cabin or on the underside of overhead luggage compartments.

Figure 7:
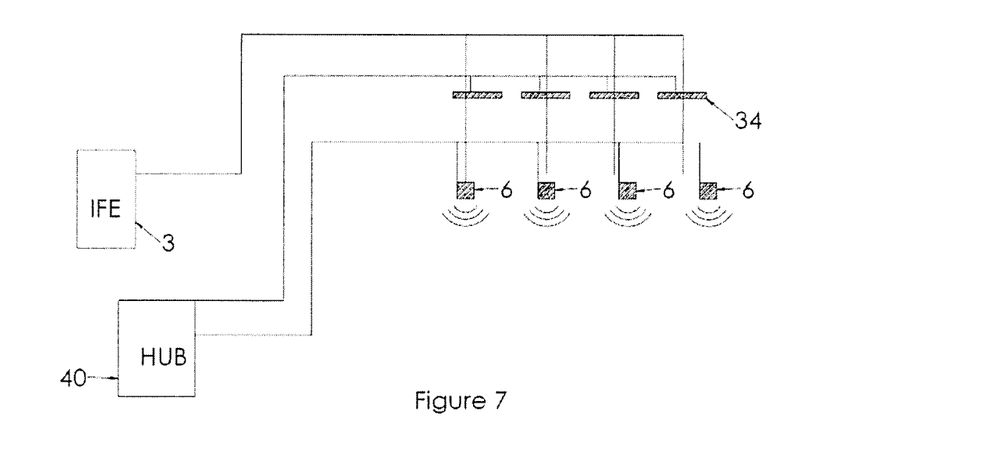
FIG. 7: shows a diagrammatic view of a further embodiment of the invention which is separate hub is used to coordinate time division or transmission.

Turning now to FIG. 7, a further embodiment is illustrated in which a hub 40 which is separate from the media server of the IFE system coordinates time division multiplexing of the transmitters 6, rather then having processing occurring at the transmitters. In this embodiment, the hub 40 receives a media signal, e.g. the audio signal, as delivered to each of the individual passenger seats from the IFE, and time division multiplexes and encodes the data appropriately for delivery to the transmitters 6.

Figure 8:
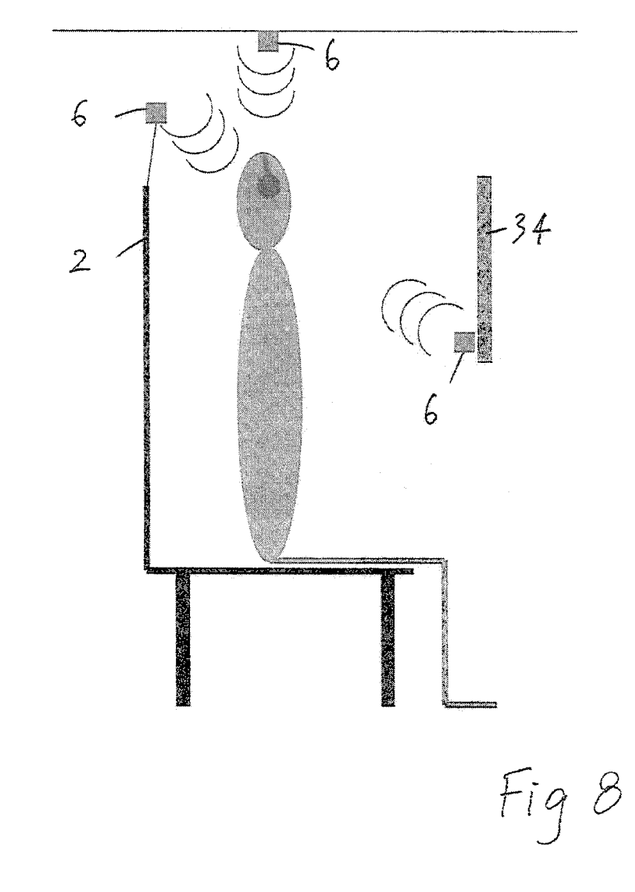
FIG. 8: shows a further embodiment of the invention in which a plurality of transmitters at predetermined locations are used to provide coverage for a passenger location.

In FIG. 8, a further embodiment is shown in which multiple transmitters 6 are provided adjacent to a seat location to be provided with the media signal. As can be shown in FIG. 8, three transmitters are provided in appropriate locations that limit the coverage afforded by the signal transmitted by each transmitter unit. Therefore, one transmitter is provided to adjacent to, or dependent from, the seat 2, another is provided in ceiling or headspace above the seat and yet a further transmitter is provided adjacent to, or co-located with, the visual display unit. The signal strength from each transmitter may be limited to avoid or limit any spillover, but is still sufficient so that when a user moves a headset within a selected region of the seat location, the signal from at least one of the transmitters is received by the headset. Therefore, for example, the headset may typically receive a signal from the transmitter provided on the seat when the user is resting in the seat. When the user is sitting upright in the seat or is leaning forward slightly, then the signal is received from either the overhead transmitter, or from the transmitter adjacent to the visual display unit.

In yet a further embodiment of the invention the transmitter 6 may comprise the visual display unit. In particular, a back-light of a liquid crystal display unit, for example, may be modulated to provide the optical transmission signal that provides audio information to a headset that may be used by the user. Alternatively, the display itself may be modulated to provide the signal.

Features from various embodiments described herein may be combined or substituted with those of other embodiments.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

Where, in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as described herein.

The invention claimed is:

1. A wireless media distribution system for a passenger vehicle having a plurality of passenger locations, the system comprising:
   a media server;
   a plurality of optical transmitters adapted to wirelessly transmit media signals representative of media delivered from the media server;
   a plurality of channels used by the optical transmitters to wirelessly transmit said media signals; and
   a plurality of discrete coverage zones, each discrete coverage zone including one or more adjacent passenger locations;
   wherein each optical transmitter is adapted to direct a media signal to a selected passenger location or a group of passenger locations; and
   wherein the allocation of the passenger locations to the discrete coverage zones enables identical channels to be reused in adjacent discrete coverage zones.

2. A wireless media distribution system as claimed in claim 1 wherein each transmitter transmits a media signal to a group of passenger locations using a plurality of channels.

3. A wireless media distribution system as claimed in claim 1 wherein the channels are time division multiplexed.

4. A wireless media distribution system as claimed in claim 3 comprising a central processor for the plurality of transmitters.

5. A wireless media distribution system as claimed in claim 1 wherein the media signal is directed by shaping the signal.

6. A wireless media distribution system as claimed in claim 5 wherein the media signal is shaped using a lens.

7. A wireless media distribution system as claimed in claim 1 wherein a plurality of transmitters direct a media signal to a single passenger location.

8. A wireless media distribution system as claimed in claim 1 wherein the transmitted media signal comprises an infrared signal.

9. A wireless media distribution system as claimed in claim 1 wherein the media signal is adapted for reception by a media player device associated with a passenger located in the passenger location.

10. A wireless media distribution system as claimed in claim 9 wherein the media player device comprises a headset or earphone.

11. A wireless media distribution system as claimed in claim 10 wherein the headset or earphone includes a plurality of receivers for receiving the media signal.

12. A wireless media distribution system as claimed in claim 1 wherein the transmitter is integral or co-located with a visual display unit.

13. A wireless media distribution system as claimed in claim 1 wherein the transmitter comprises a light or backlight of a visual display unit.

14. A wireless media distribution system as claimed in claim 1 including a media player device comprising a plurality of optical signal receivers for receiving a media signal from the media distribution system, and a processor for processing the received signal.

15. A wireless media distribution system as claimed in claim 14 wherein the media player device comprises a headset.

16. A wireless media distribution system as claimed in claim 14 comprising a dock for supporting a media player device when not in use.

17. A wireless media distribution system as claimed in claim 1 wherein at least one discrete coverage zone has a plurality of optical transmitters adapted to wirelessly transmit a common media signal.

18. A wireless media distribution system as claimed in claim 1 wherein a coverage zone is sized to allow a media player device to be moved in the zone and still maintain communication with a transmitter for that zone.

19. A wireless media distribution system as claimed in claim 18, wherein the coverage zone is approximately as wide as an aircraft seat.

20. A wireless media distribution system as claimed in claim 1, wherein the optical transmitters reuse a channel in adjacent coverage zones.

21. A wireless media distribution system as claimed in claim 1, wherein at least two adjacent coverage zones slightly overlap.

22. A method of wireless media distribution for a wireless media distribution system in a passenger vehicle, the system comprising a media server, a plurality of optical transmitters, a plurality of passenger locations and at least one media player device, the method comprising:
   associating one or more of a plurality of optical transmitters with one or more of a plurality of discrete coverage zones, each discrete coverage zone including a passenger location;
   adapting the optical transmitters to transmit substantially only to the associated discrete coverage zone,
   wirelessly transmitting media signals from the optical transmitters to the associated discrete coverage zones, the media signals representative of media delivered from the media server;
   wherein a media player device in a first discrete coverage zone will receive a media signal transmitted to the first discrete coverage zone and, if moved to an adjacent second discrete coverage zone, will receive a media signal transmitted to the second discrete coverage zone.

23. A method as claimed in claim 22 wherein at least one of the optical transmitters has a plurality of channels, wherein at least one channel is multiplexed so as to provide different media signals to a plurality of passenger locations in a discrete coverage zone.

24. A method as claimed in claim 23 further comprising associating the media player device with the discrete coverage zone by assigning the media player device one or more of the plurality of channels.

25. A wireless media distribution system for a passenger vehicle having a plurality of passenger locations, the system comprising:
   a media server;
   a plurality of optical transmitters adapted to wirelessly transmit media signals representative of media delivered from the media server;
   a plurality of channels used by the optical transmitters to wirelessly transmit said media signals; and
   a plurality of discrete coverage zones, each discrete coverage zone including one or more adjacent passenger locations and associated with at least one of the optical transmitters, each optical transmitter adapted to direct a media signal to the associated discrete coverage zone;
   wherein the discrete coverage zones enable identical channels to be reused in adjacent discrete coverage zones.

26. A wireless media distribution system as claimed in claim 25 wherein each transmitter transmits a media signal to a group of passenger locations using a plurality of channels.

27. A wireless media distribution system as claimed in claim 25 wherein a plurality of transmitters direct a media signal to a single passenger location.

28. A wireless media distribution system as claimed in claim 25 wherein at least one media player device includes a plurality of receivers for receiving the media signal.

29. A wireless media distribution system as claimed in claim 25 wherein the transmitter is integral or co-located with a visual display unit.

30. A wireless media distribution system as claimed in claim 25 wherein the transmitter comprises a light or backlight of a visual display unit.

31. A wireless media distribution system as claimed in claim 25 wherein at least one discrete coverage zone has a plurality of optical transmitters adapted to wirelessly transmit a common media signal.

32. A wireless media distribution system as claimed in claim 25 wherein the allocation of the passenger locations to the discrete coverage zones enables identical channels to be reused in adjacent discrete coverage zones.

33. A wireless media distribution system as claimed in claim 25 wherein at least adjacent two coverage zones slightly overlap.

* * * * *